US012585937B2

(12) United States Patent
Thampy et al.

(10) Patent No.: US 12,585,937 B2
(45) Date of Patent: Mar. 24, 2026

(54) SYSTEMS AND METHODS FOR DEEP LEARNING ENHANCED GARBAGE COLLECTION

(71) Applicant: Hewlett Packard Enterprise Development LP, Houston, TX (US)

(72) Inventors: Sajjit Thampy, San Jose, CA (US); Krishna Sirisha Motamarry, San Jose, CA (US); Gyan Bhal, San Jose, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 1129 days.

(21) Appl. No.: 17/317,435

(22) Filed: May 11, 2021

(65) Prior Publication Data

US 2022/0366234 A1     Nov. 17, 2022

(51) Int. Cl.
  *G06N 3/08* (2023.01)
  *G06F 12/02* (2006.01)
  *G06N 3/044* (2023.01)

(52) U.S. Cl.
  CPC ........... *G06N 3/08* (2013.01); *G06F 12/0253* (2013.01); *G06N 3/044* (2023.01)

(58) Field of Classification Search
  CPC ....... G06N 3/08; G06N 3/044; G06F 12/0253
  See application file for complete search history.

(56) References Cited

U.S. PATENT DOCUMENTS

| | | | | |
|---|---|---|---|---|
| 11,526,434 | B1 * | 12/2022 | Brooker ................ | G06F 9/5077 |
| 2016/0150072 | A1 * | 5/2016 | Rangarajan ....... | H04W 52/0254 |
| | | | | 455/574 |
| 2018/0247215 | A1 * | 8/2018 | Garvey .................. | G06N 20/00 |
| 2019/0317901 | A1 | 10/2019 | Kachare et al. | |
| 2020/0133898 | A1 * | 4/2020 | Therene .............. | G06F 13/1668 |

OTHER PUBLICATIONS

Plainfosse et al. "A Survey of Distributed Garbage Collection Techniques," Lection Notes in Computer Science (LNCS, vol. 986) , 1995, pp. 211-249. (Year: 1995).*

Degenbaev et al. "Idle Time Garbage Collection Scheduling," PLDI '16 Proceedings of the 37th ACM SIGPLAN Conference on Programming Language Design and Implementation, 2016, pp. 570-583, (Year: 2016).*

(Continued)

*Primary Examiner* — Kyle R Stork
(74) *Attorney, Agent, or Firm* — Hewlett Packard Enterprise Patent Department

(57) ABSTRACT

Examples disclosed herein relate to systems and methods for deep learning enhanced garbage collection. Disclosed methods may include receiving, at a controller of an array, a time series dataset including a number of writes and a number of deletes; generating, by the controller, a tensor by encoding the time series data using a plurality of frequencies; determining a pattern in the time series data; generating a forecast of deletes based on the pattern; determining, based on the forecast, a number of cumulative deletes to the array at a predetermined time; at the predetermined time, comparing the forecasted number of cumulative deletes with a number of actual deletes to the array; and based on the comparison, scheduling a garbage collection (GC) algorithm to run on the array.

20 Claims, 5 Drawing Sheets

(56)         References Cited

OTHER PUBLICATIONS

Chakraborttii et al., "SSD QoS Improvements through Machine Learning", (Research Paper), SoCC '18: Proceedings of the ACM Symposium on Cloud Computing, Oct. 11, 2018, 2 pages.

Jay Alammar, "The Illustrated Transformer", available online at <http://jalammar.github.io/illustrated-transformer/>, Jun. 27, 2018.

Kazemi et al., "Time2Vec: Learning a Vector Representation of Time", Jul. 11, 2019, 6 pages.

Kim et al., "Alleviating Garbage Collection Interference Through Spatial Separation in All Flash Arrays", USENIX Annual Technical Conference, Jul. 10-12, 2019, 15 pages.

Missimer K, "Exploiting Solid State Drive Parallelism for Real-Time Flash Storage", (Research Paper), 2020, 118 Pages.

Nagel et al., "Time-efficient Garbage Collection in SSDs", (Research Paper), Jul. 24, 2018, 13 Pages.

Park et al., "SSD Garbage Collection Detection and Management with Machine Learning Algorithm", International Journal of Control and Automation , vol. 11, Issue No. 4, 2018, 10 pages.

Theodore P. Hill, "Knowing When to Stop", American Scientist, available online at <https://www.americanscientist.org/article/knowing-when-to-stop>, 2021, 16 pages.

Vaswani et al., "Attention Is All You Need", Dec. 6, 2017, 15 pages.

Yang et al., "Analytical Modeling of Garbage Collection Algorithms in Hotness-aware Flash-based Solid", IEEE, 2014, 10 pages.

Yang et al., "PIPULS: Predicting I/O Patterns Using LSTM in Storage Systems", 2019, 12 pages.

* cited by examiner

500

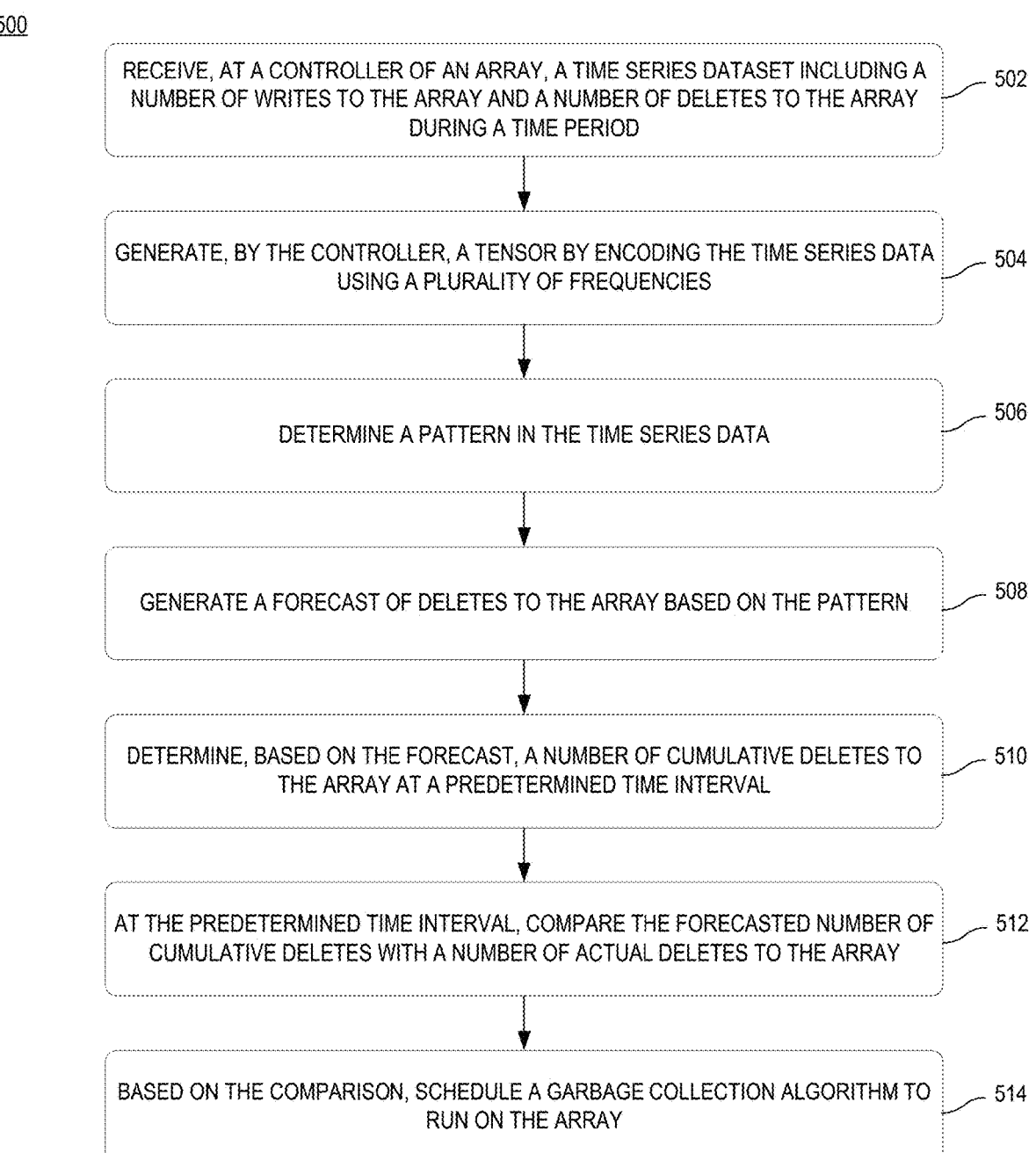

RECEIVE, AT A CONTROLLER OF AN ARRAY, A TIME SERIES DATASET INCLUDING A NUMBER OF WRITES TO THE ARRAY AND A NUMBER OF DELETES TO THE ARRAY DURING A TIME PERIOD — 502

GENERATE, BY THE CONTROLLER, A TENSOR BY ENCODING THE TIME SERIES DATA USING A PLURALITY OF FREQUENCIES — 504

DETERMINE A PATTERN IN THE TIME SERIES DATA — 506

GENERATE A FORECAST OF DELETES TO THE ARRAY BASED ON THE PATTERN — 508

DETERMINE, BASED ON THE FORECAST, A NUMBER OF CUMULATIVE DELETES TO THE ARRAY AT A PREDETERMINED TIME INTERVAL — 510

AT THE PREDETERMINED TIME INTERVAL, COMPARE THE FORECASTED NUMBER OF CUMULATIVE DELETES WITH A NUMBER OF ACTUAL DELETES TO THE ARRAY — 512

BASED ON THE COMPARISON, SCHEDULE A GARBAGE COLLECTION ALGORITHM TO RUN ON THE ARRAY — 514

FIG. 5

SYSTEMS AND METHODS FOR DEEP LEARNING ENHANCED GARBAGE COLLECTION

BACKGROUND

When an array reaches a particular capacity, a garbage collection (GC) algorithm may run on the array to clear segments of the array marked for deletion. However, a segment marked for deletion may be contained in the same block as a segment which still stores valid data. Accordingly, before a GC algorithm runs, the valid data may be copied to another location in the array. However, this may result in write latency. For example, the execution of a GC algorithm may cause central processing unit (CPU) latency if the CPU is attempting to perform a write to the flash memory at the same time. As the GC algorithm executes, input/output (I/O) latency may arise if a copy operation of the GC algorithm runs concurrently with a write job.

BRIEF DESCRIPTION OF THE DRAWINGS

The following detailed description references the drawings, wherein:

FIG. 5 is a flowchart illustrating an example method for deep learning enhanced garbage collection, in accordance with disclosed embodiments.

Figure 1:
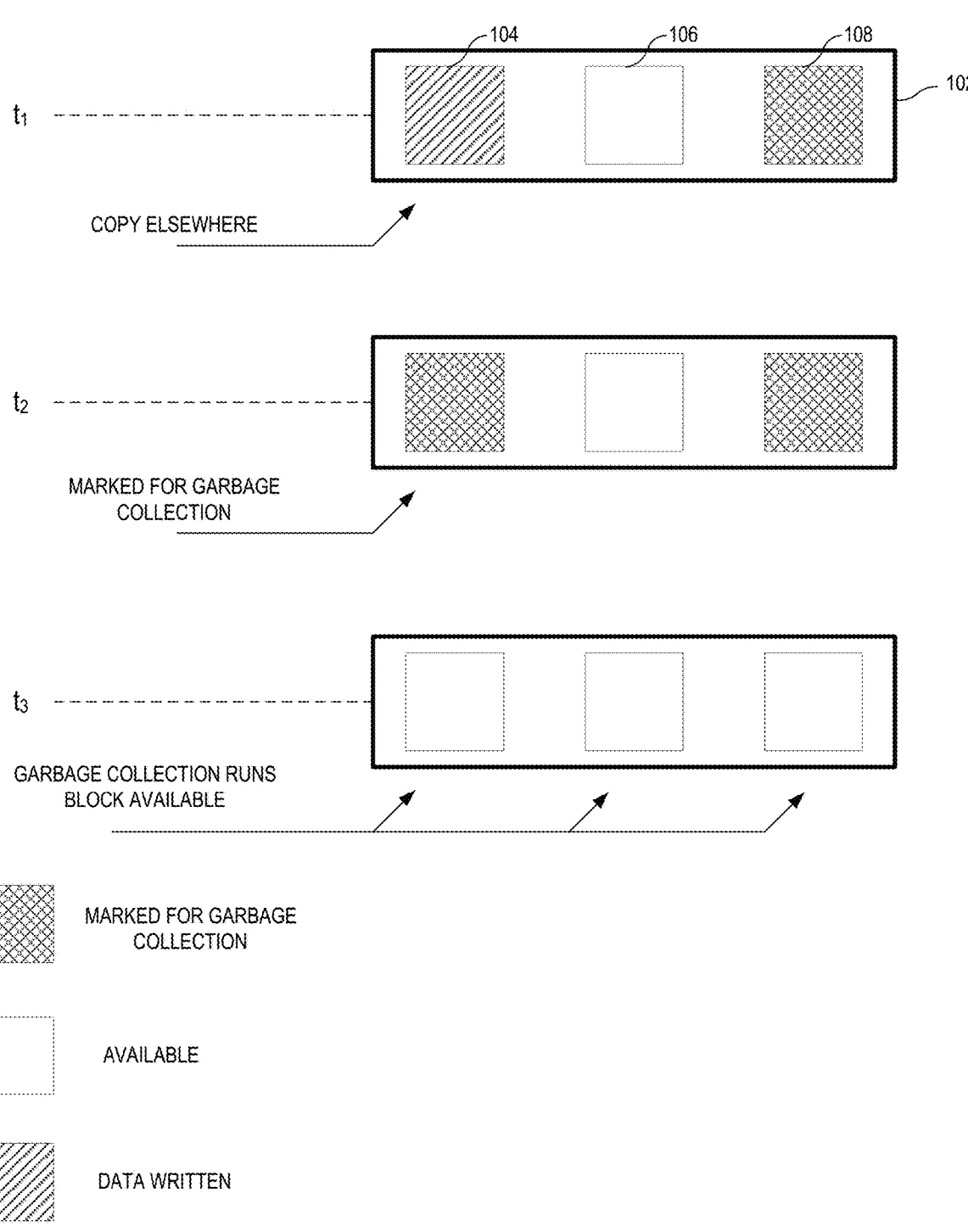
FIG. 1 is an illustration of an exemplary block in a flash array, in accordance with disclosed embodiments.

Throughout the drawings, identical reference numbers may designate similar, but not necessarily identical, elements. An index number "N" appended to some of the reference numerals may be understood to merely denote plurality and may not necessarily represent the same quantity for each reference numeral having such an index number "N". Additionally, use herein of a reference numeral without an index number, where such reference numeral is referred to elsewhere with an index number, may be a general reference to the corresponding plural elements, collectively or individually. In another example, an index number of "I," "M," etc. can be used in place of index number N.

Throughout the drawings, identical reference numbers designate similar, but not necessarily identical, elements. The figures are not necessarily to scale, and the size of some parts may be exaggerated to more dearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context dearly indicates otherwise. Also, the term "includes," "including," "comprises," "comprising," "have," or "having" when used in this disclosure specifies the presence of the stated elements, but do not preclude the presence or addition of other elements.

In some examples, flash memory may be used over hard drives because of flash memory's increased speed and reduced power consumption. However, flash memory may be limited in its operation by the garbage collection (GC) process. For example, the execution of a GC algorithm may cause central processing unit (CPU) latency if the CPU is attempting to perform a write to the flash memory at the same time. For example, as the GC algorithm executes, input/output (I/O) latency may arise if a copy operation of the GC algorithm runs concurrently with a write job.

In conventional systems, a GC algorithm may run when the flash memory array is near a storage capacity threshold, e.g., when the array is at about 70% or more capacity. Latency may be reduced if the GC algorithm is scheduled such to avoid running concurrently with a write job to the same flash memory array. For this reason, systems may schedule the GC algorithm to run before or after a periodic write job, e.g., a daily or hourly write job. However, avoiding these schedule conflicts may be challenging where write jobs occur sporadically, or otherwise at non-periodic and/or at non-predetermined times.

Disclosed embodiments may use a deep learning algorithm to accurately forecast writes and deletes based on historical time series sensor data from a flash memory array. For example, disclosed embodiments may use a gated recurrent network (GRN) with time-based positional encoding to provide an optimized GC schedule to reduce or eliminate write latency.

FIG. 1 provides an illustration of an exemplary flash memory array, according to disclosed embodiments. FIG. 1 illustrates a block 102, which may represent a block in a flash memory array. In this example, block 102 may contain three memory segments: segment 104, segment 106, and segment 108. While three example segments, 104, 106, and 108 respectively, are shown for purposes of clarity and conciseness, flash memory array may include any number of segments.

In this example, a GC algorithm may be triggered to run on block 102. In this example, segment 104 contains data, segment 106 is available to be written with data, and segment 108 is marked for GC. A GC algorithm may be triggered to run on block 102, for example, if the flash array containing block 102, or block 102 itself, reaches a capacity threshold. For example, the GC algorithm may be triggered if block 102 has less than 30% capacity available.

At time $t_1$, segment 104, which currently holds data, may be copied elsewhere, e.g., to a segment in a different block of the flash array. Because segment 106 is available and segment 108 is already marked for GC, copying the data of segment 104 to another location, e.g. another block of the flash array (not shown), enables the GC algorithm to run on the entirety of block 102. This copy operation may result in latency that can be experienced by a user if the copy operation runs concurrently with a write job. For example, if a write request to a segment of block 102 is received while a GC algorithm is running, the write operation may be stalled until the GC algorithm has finished. As described below, disclosed embodiments avoid this latency by scheduling a GC algorithm to run after a delete operation, which is likely to result in some segments of the block being marked as stale. Thus, the data stored by these blocks may not need to be copied to a new location prior to GC, thereby reducing the required copy operations.

At time $t_2$, once the data stored by segment 104 is successfully copied and written to another location, segment 104 may be marked for deletion. Thus, at time $t_3$, the GC algorithm may run, resulting in the availability of segment 104, segment 106, and segment 108.

Figure 2:
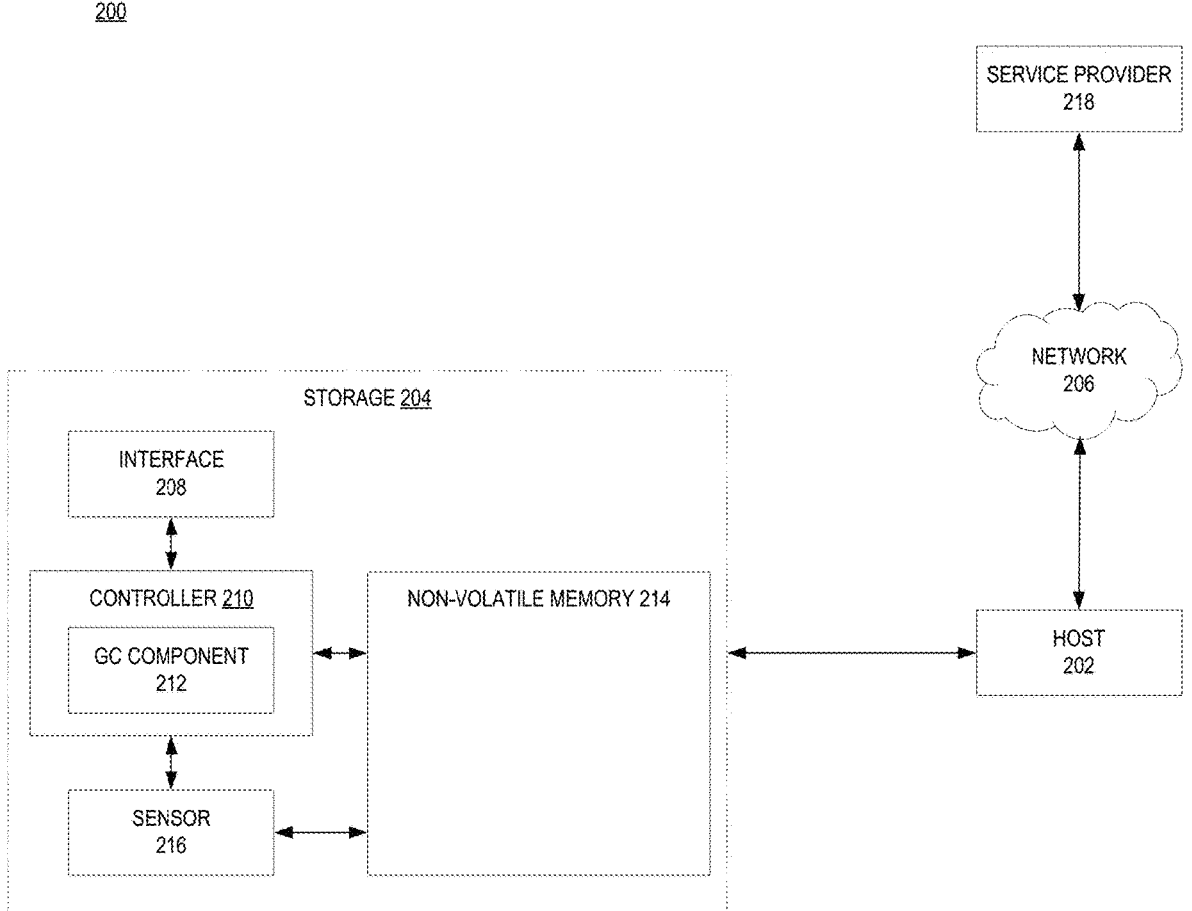
FIG. 2 is a block diagram of an example system for deep learning enhanced garbage collection, in accordance with disclosed embodiments.

FIG. 2 is a block diagram illustrating an exemplary system 200 for deep learning enhanced GC, consistent with disclosed embodiments. System 200 may include host 202 and storage 204. Host 202 may be a device such as a laptop computer, desktop computer, server, or other computing device. Storage 204 may be configured to provide storage services to host 202. In some examples, host 202 may be local to storage 204, and may for example, be part of the same physical device. In other embodiments, storage 204 may be a remote storage system managed by host 202 and host 202 may communicate with storage 204 via network 206.

Storage 204 may be an apparatus such as a persistent storage device, such as a solid-state drive (SSD), thumb drive, memory card, embedded device storage, etc. Storage 204 may include an interface 208 configured to facilitate communication between storage 204 and other devices. For example, interface 208 may enable storage 204 to communicate with host device 202.

Storage 204 may further include one or more controllers 210. Controller 210 may be, for example, a general- or special-purpose processor that performs operations of storage 204. For example, controller 210 may be a microprocessor, digital signal processor (DSP), application specific integrated circuit (ASIC), field programmable gate array (FPGA), or the like. Further, controller 210 may be any combination of one or more of the above components.

Controller 210 may further include a GC component 212 configured to schedule, manage, and/or execute GC algorithms to run on non-volatile memory 214 of storage 204. For example, GC component 212 may include operational logic to perform the garbage collection processes described herein.

Controller 210 may further be coupled to a sensor 216. Sensor 216 may be a device and may include circuitry configured to detect time series data indicative of write and/or delete operations performed on non-volatile memory 214. In some examples, sensor 216 may be communicatively connected to controller 210, such that data collected by sensor 216 may at least partially dictate when GC algorithm execution, management, and scheduling is to be performed.

Non-volatile memory 214 may include a flash memory array or other type of non-volatile memory. For example, non-volatile memory 214 may include blocks, each block containing one or more memory segments.

As an example, in some embodiments, sensor 216 may collect time series data including write and delete operations on an array of non-volatile memory 214. In some embodiments, sensor 216 may collect data from multiple arrays. In other embodiments, storage 204 may include multiple sensors, each sensor being coupled to one or more arrays.

Sensor 216 may provide the collected time series data to controller 210. GC component 212 may be configured to encode time using periodic functions (e.g., sine and/or cosine). In some examples, time may be encoded using a positional encoding (PE) mechanism. For example, the PE mechanism may enable a finite dimensional representation of the location of items in a sequence. Here, PE may represent the number or size of write and/or delete operations in a time interval.

Different periodic patterns of writes and/or deletes may be captured using the PE mechanism at different time intervals. For example, the time series data may be encoded to capture weekly, daily, hourly, etc. patterns of writes and/or deletes on an array. In some embodiments, any periodic function may be used to encode a frequency. For example, a sine function may be used to encode a weekly frequency, a cosine function may be used to encode a daily frequency, etc.

In some embodiments, the system may enable a user to dynamically select time intervals at which to encode the time series data. For example, via a graphical user interface (GUI), a user may select the number of time intervals and/or periodicity with which to encode the time series data. For example, a user could choose to encode data at hour intervals. In another example, a user could add an interval with which to encode data, such that the data is encoded at the monthly, weekly, daily, and hourly intervals. For example, a system of a user may have loads that run every fifteen minutes, ten minutes, or five minutes. In such instances, additional frequencies, e.g., every half hour or every fifteen minutes, may enable the system to forecast writes and/or deletes at a more granular level. Such systems may include those associated with virtual machines (VMs) that support near real-time data processing.

Controller 210 may store the encoding in a memory component. In some examples, controller 210 may store the memory component as a tensor. Unlike conventional methods of positional encoding, by using, for example, three time intervals with sine and cosine functions, described embodiments may reduce the feature space associated with the encoding. For example, to one-hot encode a single data point, a system may have twenty-four new features indicating whether the time belongs to a certain hour of the day. Further, at the minute level, positional encoding may result in 1440 features (e.g., 24 hours*60 minutes). Disclosed embodiments may reduce this feature space from 1440 to six without losing accuracy through the use of three time intervals with sine and cosine functions.

In some embodiments, GC component 212 may couple the tensor with a GRN. The GRN may have a number of layers and may be used to generate a cyclical pattern associated with writes and/or deletes to the array. In some embodiments, the host 202 may transmit the tensor to service provider 218 for analysis. For example, service provider 218 may receive the tensor and/or the encoded data and apply the tensor/encoded data to a GRN to determine a pattern of writes and/or deletes. In some embodiments, service provider 218 may receive a subset of the encoded data.

In some embodiments, the patterns of writes and/or deletes to the array may not be cyclical. In such instances, backward induction techniques may be used to accurately forecast non-cyclical, partially cyclical, or random writes and/or deletes. In other embodiments, backward induction may enable the system to balance whether to postpone running the GC algorithm until a later time versus running the GC algorithm at a certain time after the system has postponed running the GC algorithm.

Backward induction may refer to the process of reasoning backwards in time to determine an optimal sequence of actions. Backward induction is an iterative process and may be used to determine whether it is optimal to run a GC algorithm at a point in time based on the generated forecast. For example, at each time interval, the system may determine whether the GC algorithm should be run at that point. The backward induction process may step backward through the time series data to identify points in time at which to run the GC algorithm. This analysis may then be used to generate a schedule by which to run the GC algorithm.

For example, backward induction may enable the system to determine a schedule by which to run a GC algorithm based on the forecast of write and/or delete operations. For instance, based on a likelihood of an upcoming write and/or delete operation, the system may schedule the GC algorithm to run before or after the delete operation, or before the write operation.

Further, based on a backward induction algorithm, the system may determine whether to run the GC algorithm after a predetermined number of time intervals to ensure that the GC algorithm runs. For example, if the number of actual deletes in a predetermined time interval is less than the forecasted deletes, the GC algorithm may not be run during that time interval. If the number of actual deletes is less than the number of forecasted deletes over a series of time intervals, the GC algorithm may not run. To ensure that the GC algorithm eventually runs, a decay factor may be applied to the forecasted number of deletes. Thus, it may become more likely that the GC algorithm runs as time progresses.

The output of the GRN may be used, by GC component 212 or service provider 218, in conjunction with backward induction techniques to generate a multistep forecast of writes and/or deletes. In some embodiments, a multistep forecast may include tables of cumulative writes and/or deletes to the array (e.g., non-volatile memory 214). For example, a table may include a forecasted number of cumulative writes and/or deletes at a given time. At the given time, the forecasted number of cumulative writes and/or deletes may be compared to an actual number of cumulative writes and/or deletes to the array at the given time.

Based on the comparison, GC component 212 or service provider 218 may cause a GC algorithm to run on the array or may schedule the GC algorithm to run on the array at that given time in the future. As an example, if the actual number of writes and/or deletes is greater than a threshold number of forecasted cumulative writes and/or deletes, the GC algorithm may be scheduled to run at that time. The threshold number of writes and/or deletes may be a multiple of the forecasted number of cumulative writes and/or deletes. The multiple may be, e.g., 2, 1.5, 1.2, etc.

In some embodiments, for each passing forecasted unit of time, if the actual number of writes and/or deletes are less than the threshold number of cumulative writes and/or deletes, the multiplier may be decreased. This may occur due to bias causing the GRN-trained model to overestimate the number of writes and/or deletes. For example, the multiplier may be decreased linearly, e.g., if the multiplier at a first time is 1.2, the multiplier at a second time may be decreased to 1.18, and at a third time may be decreased to 1.16. In some embodiments, the multiplier may be decreased by another function.

In some embodiments, to account for model bias, if the GC algorithm is not run during a particular window of the multistep forecast, the system may multiply the forecasted values in the next step by a decay factor (e.g., 0.8, 0.75, 0.6, etc.). Thus, the GC algorithm will eventually run on the array even if there is a bias or over estimation.

In some embodiments, this method may run in real-time to trigger a GC algorithm to run when the actual number of writes and/or deletes is greater than the threshold number of forecasted writes or deletes. In other embodiments, the method may be used to generate a schedule by which to run the GC algorithm. For example, the GC algorithm may be scheduled to run after a forecasted delete operation when the forecasted delete operation has a size greater than a given threshold. The threshold may be, e.g., a number of gigabytes, megabytes, etc. of the delete operation. In other embodiments, the GC algorithm may be scheduled to run before or after a write operation that is greater than a given threshold.

In some embodiments, host 202 may communicate via network 206 with a service provider 218. Service provider 218 may be configured to provide host 202 with access to the storage services and/or functionality of storage 204.

In some embodiments, for example, service provider 218 may include a data center agent configured to manage one or more storage services or devices (e.g., storage 204).

In some embodiments, storage 204 may communicate with service provider either directly, via network 206, or via host 202 with service provider 218. For example, controller 210 may receive load data and/or GC scheduling data from service provider 218 via an application programming interface (API) of service provider 218.

Figure 3:
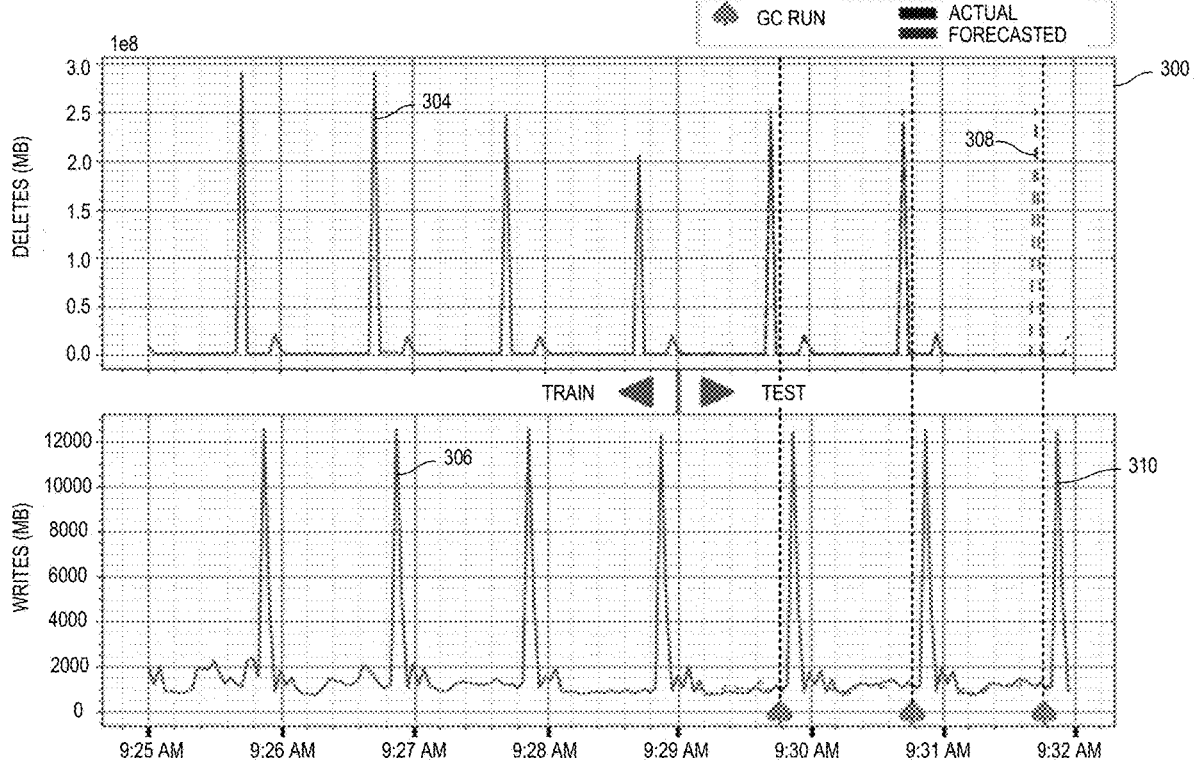
FIG. 3 is provides exemplary write and delete data, in accordance with disclosed embodiments.
Figure 4:
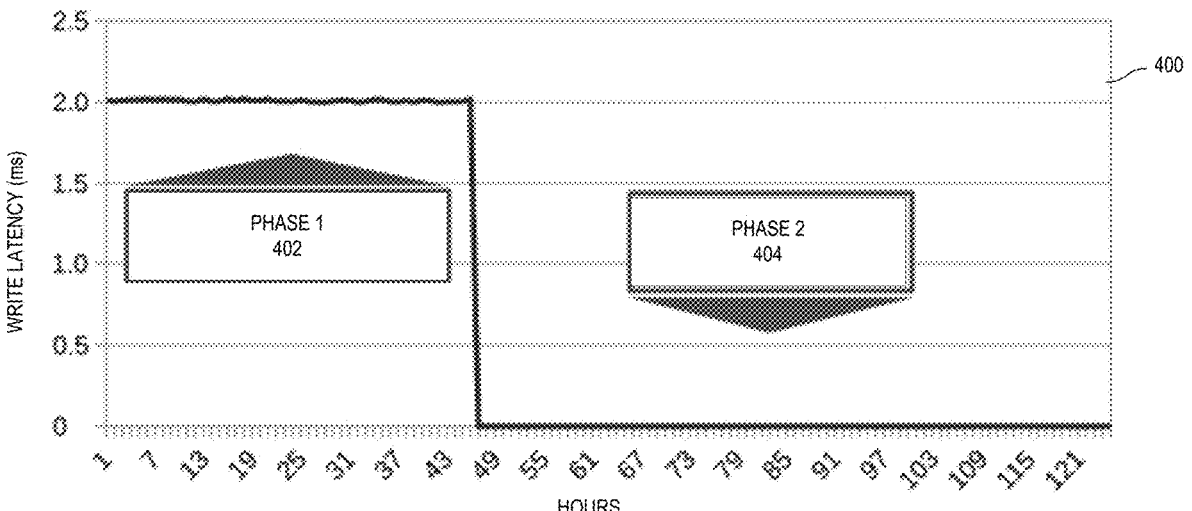
FIG. 4 is a graph of exemplary write latency data, in accordance with disclosed embodiments.

FIGS. 3 and 4 provide example data of the reduced or eliminated latency caused by implementation of disclosed embodiments.

FIG. 3 illustrates two graphs 300 and 302, respectively, of example write and delete operation data. Graph 300 provides a plot of hourly deletes to an array, while graph 302 provides a plot of hourly writes to the array. In some embodiments, the write and/or delete data may be captured by one or more sensors (e.g., sensor 216) coupled to a flash array. The collected data may be encoded and the encoded delete data 304 and encoded write data 306 may be used to train a model using a GRN.

The resulting model may yield a delete operation forecast 308 and a write operation forecast 310. In some embodiments, the GRN-generated forecast may be coupled with a backward induction algorithm to generate a schedule for running a GC algorithm. For example, applying backward induction to the write and/or delete forecasts may predict that the GC algorithm should be scheduled to run after predicted delete operations and before predicted write operations.

The example results displayed in graphs 300 and 302 illustrate the ability of the GRN to accurately forecast write and delete operations based on received encoded data. Further, with backward induction, the GC algorithm may be scheduled to run, based on the forecast, after forecasted delete operations and before forecasted write operations. In some embodiments, the determination of whether the GC algorithm should run after a forecasted delete operation may be based on a comparison of the forecasted delete volume (e.g., in MB) with a threshold delete volume. For example, if the delete volume is greater than a threshold volume, the GC algorithm may be scheduled to run after that forecasted delete operation.

FIG. 4 illustrates a graph 400 of write latency versus time (in hours). Graph 400 illustrates the results of a two-phase test of a GC algorithm scheduling method, consistent with disclosed embodiments. For example, a flash array was filled with 70% random data, thereby triggering a GC algorithm to run on the flash array. Further, a cyclical load cycle was introduced to write a random file to 80% and then delete the data from the random file. This process yielded the data of Phase 1 (402). During this phase, using conventional methods for triggering a GC algorithm to run (e.g., the array capacity reaches 70-80%), the array experienced a write latency of about 2 miliseconds.

During Phase 2 (404), the GC algorithm was scheduled to run based on the write and delete operations forecasted by an algorithm consistent with disclosed embodiments (e.g., using positional encoding coupled with a GRN). The method used in Phase 2 (404) decreased the write latency experienced by the array. Accordingly, disclosed methods may enable a reduction of write latency when running a GC algorithm on an array.

FIG. 5 is a flowchart of a method 500 for managing and executing a GC algorithm, in accordance with disclosed embodiments. Although execution of method 500 is described below with reference to system 200, method 500 may be executed by any other processing device, computing system, and/or permutation thereof. Additionally, the components for executing the method 500 may be spread among multiple devices. Method 500 may be implemented in the form of executable instructions stored on a machine-readable storage medium, such as a storage medium host 202, storage 204, or service provider 218, and/or in the form of electronic circuitry.

At block 502, the system may receive, at a controller of an array, a time series dataset describing a number of writes to the array and a number of deletes to the array. For example, as discussed above, sensor 216 may collect time series data (e.g., as shown in FIG. 3) indicative of operations to a memory array. Sensor 216 may provide the time series data to the controller, e.g., controller 210. In some embodiments, sensor 216 may be configured to collect data on write operations, delete operations, or both write and delete operations. In some embodiments, the time series data may include a volume (e.g., in MB) of write and/or delete operations to the array.

At block 504, the system may generate, by the controller, a tensor by encoding the time series data using a number of frequencies. For example, a GC component 212 of a controller 210 may receive time series data from a sensor 216 coupled to an array. GC component 212 may use a number of frequencies to encode the time series data and may store the encoding as a tensor. The frequencies may include various time intervals, such as an hourly interval, a daily interval, a weekly interval, etc.

At block 506, the system may determine, by applying the tensor to a GRN, a pattern in the time series data. The system may, for example, apply the tensor to the GRN to identify one or more patterns existing within the time series data. For example, patterns may indicate when large delete and/or write operations are expected to occur at each of the encoded frequencies. In some embodiments, based on the tensor and the combination of frequencies, the system may determine a forecast of non-cyclical patterns. For example, such patterns may arise in systems handling inconsistent operations, such as an email server. In other embodiments, the patterns may be cyclical. For example, a system may perform backup storage at predetermined times.

At block 508, the system may generate a forecast of writes and/or deletes to the array based on the pattern. For example, the generated pattern may be used to generate a model of write and/or delete operations on the array. The forecast may be based on a combination of the tensor data and the number of writes and/or deletes to the array at various times.

At block 510, the system may determine, based on the forecast, a number of cumulative deletes and/or cumulative writes to the array during a predetermined time interval. The time interval may be based on one of the frequencies with which the time series data was encoded. For example, if the data was encoded at a weekly interval, a daily interval, and an hourly interval, the predetermined time interval may be a particular minute of the hour, hour of the day, or day of the week.

At block 512, the system may, at the predetermined time interval, compare the forecasted number of cumulative deletes with a number of actual deletes to the array at the predetermined time interval. In some embodiments, alternatively or in addition, the system may compare the forecasted number of cumulative writes with a number of actual writes to the array. For example, the forecast may include a table of the forecasted numbers of write and/or delete operations at various times. At each respective time interval, the forecasted number of writes and/or deletes stored in the table may be compared to an actual number of writes and/or deletes, respectively.

At block 514, based on the comparison, the system may schedule a GC algorithm to run on the array. For example, as preciously described, the actual number of writes and/or deletes may be compared to a threshold amount. The threshold amount may be determined based on applying a multiplier to the forecasted number of writes and/or deletes at the predetermined time interval. In some embodiments, the GC algorithm may run, or may be scheduled to be run at a future time, if the actual number of writes and/or deletes is greater than the threshold number of writes and/or deletes. In some embodiments, the model may be further coupled with a backward induction algorithm to determine the schedule at which to run the GC algorithm.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described. Thus, features described with reference to one or more implementations can be combined with other implementations described herein.

What is claimed is:

1. A system comprising:
a memory device storing instructions; and
a processing device configured to execute the instructions to:
    receive, at a controller of a memory array, a time series dataset including a number of write operations to the memory array and a number of delete operations to the memory array during a time period;
    generate, by the controller, a tensor by encoding the time series data using a plurality of frequencies;
    determine a pattern in the time series data from the tensor;
    generate a forecast of delete operations to the memory array based on the pattern;
    determine, based on the forecast, a number of delete operations to the memory array at a forecasted time interval;
    at the forecasted time interval, compare a threshold number of delete operations with a number of actual delete operations to the memory array, wherein the threshold number of delete operations is based on the forecasted number of delete operations; and
    based on a determination that the number of actual delete operations is greater than the threshold number of delete operations, schedule a garbage collection (GC) algorithm to run on the memory array and run the GC algorithm to delete data stored to a block of the memory array marked for GC after a delete operation on the memory array.

2. The system of claim 1, wherein determining the pattern in the time series data comprises applying the tensor to a gated recurrent network.

3. The system of claim 1, wherein the processing device is further configured to execute instructions to:

generate a schedule for running the GC algorithm based on the forecast using backward induction.

4. The system of claim 3, wherein the delete operation comprises a number of delete operations to the memory array that is greater than the threshold number of delete operations.

5. The system of claim 3, wherein the schedule is generated based in part on a forecast of write operations to the memory array.

6. The system of claim 1, wherein the threshold number of delete operations decreases over time based on a decay factor.

7. The system of claim 1, wherein a GC agent of the memory array receives the forecasted number of delete operations via an application programming interface (API).

8. The system of claim 1, wherein the system further comprises a sensor configured to collect the time series data from the memory array.

9. The system of claim 1, wherein the processing device is further configured to execute instructions to:

determine that the number of actual delete operations is less than the forecasted number of delete operations over a series of forecasted time intervals; and based on the number of actual delete operations being less than the forecasted number of delete operations over the series of forecasted time intervals, decreasing the threshold number of delete operations by a decay factor.

10. The system of claim 1, wherein the threshold number of delete operations is greater than the forecasted number of delete operations, and wherein the threshold number of delete operations is set as a multiple of the forecasted number of delete operations.

11. The system of claim 1, wherein the forecasted time interval is based on a frequency that the time series dataset is encoded.

12. A method comprising:

receiving, at a controller of a memory array, a time series dataset including data describing a number of write operations to the memory array and a number of delete operations to the memory array during a time period;

generating, by the controller, a tensor by encoding the time series data using a plurality of frequencies;

determining a pattern in the time series data from the tensor;

generating a forecast of write operations to the memory array based on the pattern;

determining, based on the forecast, a number of write operations to the memory array at forecasted time interval;

during the forecasted time interval, comparing a threshold number of write operations with a number of actual write operations to the memory array, wherein the threshold number of write operations is based on the forecasted number of write operations; and based on a determination that the number of actual write operations is greater than the threshold number of write operations, scheduling a garbage collection (GC) algorithm to run on the memory array and run the GC algorithm to delete data stored to a block of the memory array marked for GC after a write operation on the memory array.

13. The method of claim 12, wherein determining the pattern in the time series data comprises applying the tensor to a gated recurrent network.

14. The method of claim 12, further comprising:

generating a schedule for running the GC algorithm based on the forecast using backward induction.

15. The method of claim 14, wherein the write operation comprises a number of write operations to the memory array that is greater than the threshold number of write operations.

16. The method of claim 14, wherein the schedule is generated based in part on a forecast of delete operations to the memory array.

17. The method of claim 12, wherein a GC agent of the memory array receives the forecasted number of write operations via an application programming interface (API).

18. The method of claim 12, wherein the time series data is collected from the memory array by a sensor.

19. The method of claim 12, further comprising:

generating, based on the forecast, a table of write operations comprising the number of forecasted write operations at the forecasted time interval.

20. A non-transitory computer-readable medium storing instructions that, when executed on one or more processors, cause the one or more processors to:

receive, at a controller of a memory array, a time series dataset including data describing a number of write operations to the memory array and a number of delete operations to the memory array during a time period;

generate, by the controller, a tensor by encoding the time series data using a plurality of frequencies;

determine a pattern in the time series data from the tensor;

generate a forecast of write operations and delete operations to the memory array based on the pattern;

determine, based on the forecast, a number of delete operations to the memory array at a forecasted time interval and a number of write operations to the memory array at the forecasted time interval;

at the forecasted time interval, compare a threshold number of delete operations with a number of actual delete operations to the memory array and compare a threshold number of write operations with a number of actual write operations to the memory array, wherein the threshold number of delete operations is based on the forecasted number of delete operations and the threshold number of write operations is based on the forecasted number of write operations; and based on a determination that one or more of: the number of actual delete operations is greater than the threshold number of delete operations or the number of actual write operations is greater than the threshold number of write operations, schedule a garbage collection (GC) algorithm to run on the memory array and run the GC algorithm to delete data stored to a block of the memory array marked for GC after a delete operation or a write operation on the memory array.

* * * * *